United States Patent
Li et al.

(10) Patent No.: US 10,728,154 B2
(45) Date of Patent: Jul. 28, 2020

(54) FLOW TABLE PROCESSING METHOD AND APPARATUS

(71) Applicant: HUAWEI TECHNOLOGIES CO., LTD., Shenzhen (CN)

(72) Inventors: Jinming Li, Beijing (CN); Chengchen Hu, Xi'an (CN); Peng Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 15/892,417

(22) Filed: Feb. 9, 2018

(65) Prior Publication Data

US 2018/0167325 A1 Jun. 14, 2018

Related U.S. Application Data

(63) Continuation of application No. PCT/CN2016/094227, filed on Aug. 9, 2016.

(30) Foreign Application Priority Data

Aug. 10, 2015 (CN) .......................... 2015 1 0486210

(51) Int. Cl.
*H04L 12/803* (2013.01)
*H04L 12/721* (2013.01)
(Continued)

(52) U.S. Cl.
CPC ........ *H04L 47/125* (2013.01); *H04L 43/0882* (2013.01); *H04L 43/16* (2013.01);
(Continued)

(58) Field of Classification Search
CPC ... H04L 47/125; H04L 43/0882; H04L 43/16; H04L 45/025; H04L 45/38; H04L 45/64; H04L 45/028; H04L 45/7453
See application file for complete search history.

(56) References Cited

U.S. PATENT DOCUMENTS

2012/0120964 A1* 5/2012 Koponen ............ H04L 41/0816
370/409
2012/0201140 A1* 8/2012 Suzuki .................... H04L 45/22
370/235
(Continued)

FOREIGN PATENT DOCUMENTS

CN 101697528 A 4/2010
CN 103491095 A 1/2014
(Continued)

OTHER PUBLICATIONS

OpenFlow Switch Specification Version 1.4.0, Oct. 14, 2013. total 206 pages.

*Primary Examiner* — Ian N Moore
*Assistant Examiner* — Latresa A McCallum
(74) *Attorney, Agent, or Firm* — Kilpatrick Townsend & Stockton LLP

(57) ABSTRACT

The present disclosure relates to the communications field, and specifically, to a flow table processing method and an apparatus. The method includes: monitoring, by a switch, a flow table load of the switch; when the flow table load of the switch exceeds a preset threshold, determining, by the switch, a diffusion target of a target data flow according to a matching rule of a diffusive flow table; and when the determined diffusion target is a neighboring switch of the switch, forwarding, by the switch, the target data flow to the neighboring switch. When the flow table load of the switch exceeds the preset threshold, the switch may have been attacked. A data flow that fails to be matched to a flow entry is forwarded to the neighboring switch according to a diffusion probability, for processing by the neighboring switch.

12 Claims, 7 Drawing Sheets

(51) Int. Cl.
  *H04L 12/26* (2006.01)
  *H04L 12/751* (2013.01)
  *H04L 12/715* (2013.01)
  *H04L 12/759* (2013.01)
  *H04L 12/743* (2013.01)

(52) U.S. Cl.
  CPC ............ *H04L 45/025* (2013.01); *H04L 45/38* (2013.01); *H04L 45/64* (2013.01); *H04L 45/028* (2013.01); *H04L 45/7453* (2013.01)

(56) References Cited

U.S. PATENT DOCUMENTS

| | | |
|---|---|---|
| 2014/0089506 A1 | 3/2014 | Puttaswamy Naga et al. |
| 2014/0098669 A1 | 4/2014 | Garg et al. |
| 2014/0108632 A1 | 4/2014 | Narasimha et al. |
| 2015/0124595 A1* | 5/2015 | Yamagata ............... H04L 63/02 370/230 |
| 2015/0195183 A1 | 7/2015 | Park et al. |
| 2016/0112460 A1 | 4/2016 | Li et al. |
| 2016/0197845 A1 | 7/2016 | Puttaswamy Naga et al. |
| 2017/0085473 A1* | 3/2017 | Zhu ......................... H04L 45/64 |

FOREIGN PATENT DOCUMENTS

| | | |
|---|---|---|
| CN | 104685850 A | 6/2015 |
| CN | 104737504 A | 6/2015 |
| CN | 104767634 A | 7/2015 |
| EP | 2824878 A1 | 1/2015 |
| WO | 2015062291 A1 | 5/2015 |

\* cited by examiner

FLOW TABLE PROCESSING METHOD AND APPARATUS

CROSS-REFERENCE TO RELATED APPLICATIONS

This application is a continuation of International Application No. PCT/CN2016/094227, filed on Aug. 9, 2016, which claims priority to Chinese Patent Application No. 201510486210.0, filed on Aug. 10, 2015. The disclosures of the aforementioned applications are hereby incorporated by reference in their entireties.

TECHNICAL FIELD

The present disclosure relates to the communications field, and specifically, to a flow table processing method and an apparatus.

BACKGROUND software-defined networking (SDN) is a network architecture in which control and forwarding are separate. In the SDN architecture, control functions of network devices are abstracted to a controller, and the controller delivers flow entries to the network devices. The network device receives and stores the flow entry delivered by the controller, and operates a data flow according to the flow entry, for example, performing such operations as forwarding, dropping, and modifying the data flow.

Such flow-based control of SDN makes extremely quick consumption of a flow table of a switch, while a hardware flow table of an SDN switch is generally implemented by using a TCAM (Ternary Content-Addressable Memory, ternary content-addressable memory). However, the TCAM has a limited capacity. Therefore, an attacker may forge a large quantity of data flows, so that the controller adds a large quantity of flow entries to the flow table of the switch, or even fills up the flow table of the switch. When no more flow entries can be added to the flow table of the switch, the switch needs to delete an existing flow entry to make room for a new flow entry.

It can be learnt from the foregoing that, when a switch is attacked, the switch receives a large quantity of attack data flows in a short time. However, these attack data flows are not matched to flow entries stored in the switch. Therefore, the switch needs to send packet_in packets to the controller to obtain flow entries that match the attack data flows. However, because a flow table of the switch has a limited capacity, flow entries of normal data flows are replaced out of the switch with the flow entries of the attack data flows. Consequently, a normal data flow has no hit, and a latency for processing the normal data flow is increased.

SUMMARY

Embodiments of the present disclosure provide a flow table processing method and an apparatus, so that a switch can quickly process a data flow, to reduce a latency for processing a normal data flow.

A first aspect of the embodiments of the present disclosure discloses a flow table processing method, where the method is applied to a software-defined network (SDN), the SDN includes a controller and a switch, and the method includes:

monitoring, by the switch, a flow table load of the switch;

when the flow table load of the switch exceeds a preset threshold, determining, by the switch, a diffusion target of a target data flow according to a matching rule of a diffusive flow table, where the target data flow is a data flow that fails to be matched to a flow table of the switch, and the diffusive flow table is delivered by the controller; and when the determined diffusion target is a neighboring switch of the switch, forwarding, by the switch, the target data flow to the neighboring switch.

With reference to the first aspect, in a first possible implementation of the first aspect, the matching rule includes a correspondence between a port number of the switch and the diffusion target;

before the determining, by the switch, a diffusion target of a target data flow according to a matching rule of a diffusive flow table, the method further includes:

determining, by the switch, a port number of an ingress port, where the ingress port is a port from which the switch receives the target data flow; and the determining, by the switch, a diffusion target of a target data flow according to a matching rule of a diffusive flow table includes:

determining, by the switch, the diffusion target of the target data flow according to the port number of the ingress port and the matching rule.

With reference to the first aspect, in a second possible implementation of the first aspect, the matching rule includes a correspondence between a numeric interval and the diffusion target, one numeric interval is corresponding to one diffusion target, and the matching rule includes at least two numeric intervals;

before the determining, by the switch, a diffusion target of a target data flow according to a matching rule of a diffusive flow table, the method further includes:

performing, by the switch, hash calculation on a packet header field of the target data flow to obtain a numeric value; and the determining, by the switch, a diffusion target of a target data flow according to a matching rule of a diffusive flow table includes:

determining, by the switch, a numeric interval that the numeric value is in; and determining, by the switch, the diffusion target according to the numeric interval and the matching rule.

With reference to the first aspect, the first possible implementation of the first aspect, or the second possible implementation of the first aspect, in a third possible implementation of the first aspect, after the determining, by the switch, a diffusion target of a target data flow according to a matching rule of a diffusive flow table, the method further includes:

when the determined diffusion target is the controller, requesting, by the switch, the controller for a flow entry that matches the target data flow.

A second aspect of the present disclosure discloses another flow table processing method, where the method is applied to a software-defined network (SDN), the SDN includes a controller and multiple switches, and the method includes:

determining, by the controller according to a network topology, a second switch directly connected to a first switch, where the first switch is any switch of the multiple switches, the second switch is a switch other than the first switch in the multiple switches, and there is at least one second switch;

obtaining, by the controller, a flow table load of the second switch;

determining, by the controller, a diffusive flow table of the first switch according to the flow table load of the second switch; and sending, by the controller, the diffusive flow table to the first switch.

With reference to the second aspect, in a first possible implementation of the second aspect, the determining, by the controller, a diffusive flow table of the first switch according to the flow table load of the second switch includes:

determining, by the controller, a forwarding path of the first switch according to a connection relationship between the first switch and the second switch, where the forwarding path is a path between the first switch and the second switch;

determining, by the controller, a diffusion probability of each forwarding path according to a flow table load of the second switch on each forwarding path; and determining, by the controller, the diffusive flow table of the first switch according to the diffusion probability of each forwarding path.

With reference to the first possible implementation of the second aspect, in a second possible implementation of the second aspect, the determining, by the controller, the diffusive flow table of the first switch according to the diffusion probability of each forwarding path includes:

determining, by the controller according to the diffusion probability of each forwarding path, a quantity of egress ports of the first switch corresponding to each forwarding path, where the egress ports of the first switch are configured to forward data flows; and determining, by the controller, the diffusive flow table of the first switch according to each forwarding path and the quantity of egress ports of the first switch corresponding to each forwarding path.

With reference to the first possible implementation of the second aspect, in a third possible implementation of the second aspect, the determining, by the controller, the diffusive flow table of the first switch according to the diffusion probability of each forwarding path includes:

determining, by the controller according to the diffusion probability of each forwarding path, a numeric interval corresponding to each forwarding path; and determining, by the controller, the diffusive flow table of the first switch according to each forwarding path and the numeric interval corresponding to each forwarding path.

A third aspect of the present disclosure discloses another flow table processing method, where the method is applied to a software-defined network (SDN), and the method includes:

monitoring, by a switch, a flow table status of the switch, where the flow table status of the switch is used to indicate flow table load; and when the flow table load of the switch exceeds a preset threshold, forwarding, by the switch, a target data flow to a neighboring switch according to a diffusion probability, where the target data flow is a data flow that fails to be matched to a flow table of the switch.

With reference to the third aspect, in a first possible implementation of the third aspect, before the diffusing, by the switch, a target data flow to a neighboring switch according to a diffusion probability, the method further includes:

calculating, by the switch, the diffusion probability according to the following formula:

$$Ps = Pmax \times \frac{avg - minthresh}{maxthresh - minthresh} + Pmin,$$

where $P_S$ is the diffusion probability, $P_{max}$ is a preset maximum diffusion probability, Pmin is a preset minimum probability, avg is the flow table usage, maxthresh is a first threshold, minthresh is a second threshold, and the first threshold is greater than the second threshold.

With reference to the third aspect or the first possible implementation of the third aspect, in a second possible implementation of the third aspect, when the flow table usage of the switch is greater than the first threshold, the method further includes:

forwarding, by the switch, the target data flow to the neighboring switch according to the preset maximum diffusion probability.

A fourth aspect of the present disclosure discloses another flow table processing method, where the method is applied to a software-defined network (SDN), the SDN includes a controller and multiple switches, and the method includes:

obtaining, by the controller, flow table loads of the multiple switches;

determining, by the controller, a connection relationship between the multiple switches according to a network topology;

determining, by the controller, a weight of each forwarding path according to the connection relationship between the multiple switches and the flow table load of each switch of the multiple switches, where the forwarding path is a path between two directly connected switches; and determining, by the controller, a forwarding path for a data flow in the SDN according to the weight of each forwarding path, so that the SDN is in a load-balanced state.

With reference to the fourth aspect, in a first possible implementation of the fourth aspect, the determining, by the controller, a weight of each forwarding path according to the connection relationship between the multiple switches and the flow table load of each switch of the multiple switches includes:

determining, by the controller, each forwarding path according to the connection relationship between the multiple switches;

determining, by the controller, switches included by each forwarding path; and determining, by the controller, the weight of each forwarding path according to a flow table load of a target switch on each forwarding path, where the target switch is a switch that receives a data flow.

With reference to the first possible implementation of the fourth aspect, in a second possible implementation of the fourth aspect, the determining, by the controller, the weight of each forwarding path according to a flow table usage of a target switch on each forwarding path includes:

calculating, by the controller, the weight of each forwarding path according to the following calculation formula:

$$f(ij) = \begin{cases} 1 & 0 < t \leq TH \\ Max \cdot e^{(t-TH)} & TH < t < 1 \end{cases},$$

where

TH is a preset flow table usage threshold, Max is a preset constant, f(ij) represents a weight of a forwarding path from a switch i to a switch j, t represents a flow table usage of the switch j, the switch i is among the multiple switches, and the switch j is among the multiple switches.

A fifth aspect of the present disclosure discloses a switch, where the switch is applied to a software-defined network (SDN), and the switch includes a monitoring unit, a first determining unit, and a diffusion unit;

the monitoring unit is configured to monitor a flow table load of the switch;

the first determining unit is configured to: when the flow table load of the switch exceeds a preset threshold, determine, a diffusion target of a target data flow according to a matching rule of a diffusive flow table, where the target data flow is a data flow that fails to be matched to a flow table of the switch, and the diffusive flow table is delivered by the controller; and the diffusion unit is configured to: when the determined diffusion target is a neighboring switch of the switch, forward, the target data flow to the neighboring switch.

With reference to the fifth aspect, in a first possible implementation of the fifth aspect, the matching rule includes a correspondence between a port number of the switch and the diffusion target, and the switch further includes a second determining unit;

the second determining unit is configured to determine a port number of an ingress port, where the ingress port is a port from which the switch receives the target data flow; and the first determining unit is configured to determine the diffusion target of the target data flow according to the port number of the ingress port and the matching rule.

With reference to the fifth aspect, in a second possible implementation of the fifth aspect, the matching rule includes a correspondence between a numeric interval and the diffusion target, one numeric interval is corresponding to one diffusion target, the matching rule includes at least two numeric intervals, and the switch further includes a hash unit;

the hash unit is configured to perform hash calculation on a packet header field of the target data flow to obtain a numeric value; and the first determining unit is configured to determine a numeric interval that the numeric value is in, and determine the diffusion target according to the numeric interval and the matching rule.

With reference to the fifth aspect, the first possible implementation of the fifth aspect, or the second possible implementation of the fifth aspect, in a third possible implementation of the fifth aspect, the first determining unit is further configured to: when the determined diffusion target is the controller, request the controller for a flow entry that matches the target data flow.

A sixth aspect of the present disclosure discloses a controller, where the controller is applied to a software-defined network (SDN), the SDN includes the controller and multiple switches, and the controller includes a determining unit, an obtaining unit, and a sending unit;

the determining unit is configured to determine, according to a network topology, a second switch directly connected to a first switch, where the first switch is any switch of the multiple switches, the second switch is a switch other than the first switch in the multiple switches, and there is at least one second switch;

the obtaining unit is configured to obtain a flow table load of the second switch;

the determining unit is further configured to determine a diffusive flow table of the first switch according to the flow table load of the second switch; and the sending unit is configured to send the diffusive flow table to the first switch.

With reference to the sixth aspect, in a first possible implementation of the sixth aspect, the determining unit includes a first determining subunit, a second determining subunit, and a third determining subunit;

the first determining subunit is configured to determine a forwarding path of the first switch according to a connection relationship between the first switch and the second switch, where the forwarding path is a path between the first switch and the second switch;

the second determining subunit is configured to determine a diffusion probability of each forwarding path according to a flow table load of the second switch on each forwarding path; and the third determining subunit is configured to determine the diffusive flow table of the first switch according to the diffusion probability of each forwarding path.

With reference to the first possible implementation of the sixth aspect, in a second possible implementation of the sixth aspect, the third determining subunit is configured to determine, according to the diffusion probability of each forwarding path, a quantity of egress ports of the first switch corresponding to each forwarding path, where the egress ports of the first switch are configured to forward data flows; and the third determining subunit is further configured to determine the diffusive flow table of the first switch according to each forwarding path and the quantity of egress ports of the first switch corresponding to each forwarding path.

With reference to the first possible implementation of the sixth aspect, in a third possible implementation of the sixth aspect, the third determining subunit is configured to determine, according to the diffusion probability of each forwarding path, a numeric interval corresponding to each forwarding path; and the third determining subunit is further configured to determine the diffusive flow table of the first switch according to each forwarding path and the numeric interval corresponding to each forwarding path.

A seventh aspect of the present disclosure discloses another switch, where the switch is applied to a software-defined network (SDN), and the switch includes a monitoring unit and a diffusion unit;

the monitoring unit is configured to monitor a flow table load of the switch; and the diffusion unit is configured to: when the flow table load of the switch exceeds a preset threshold, forward, a target data flow to a neighboring switch according to a diffusion probability, where the target data flow is a data flow that fails to be matched to a flow table of the switch.

With reference to the seventh aspect, in a first possible implementation of the seventh aspect, the switch further includes a calculation unit, where the calculation unit is configured to calculate the diffusion probability according to the following formula:

$$P_S = P\max \times \frac{\text{avg} - \text{min}thresh}{\text{max}thresh - \text{min}thresh} + P\min,$$

where $P_S$ is the diffusion probability, $P_{max}$ is a preset maximum diffusion probability, Pmin is a preset minimum probability, avg is the flow table usage, maxthresh is a first threshold, minthresh is a second threshold, and the first threshold is greater than the second threshold;

the diffusion unit is configured to: when the flow table load of the switch exceeds a preset threshold, diffuse, the target data flow to a neighboring switch according to the diffusion probability calculated by the calculation unit.

With reference to the seventh aspect or the first possible implementation of the seventh aspect, in a second possible implementation of the seventh aspect, the diffusion unit is further configured to: when the flow table usage of the switch is greater than the first threshold, forward, the target data flow to the neighboring switch according to the preset maximum diffusion probability.

An eighth aspect of the present disclosure discloses another controller, where the controller is applied to a software-defined network (SDN), the SDN includes the controller and multiple switches, and the controller includes an obtaining unit and a determining unit;

the obtaining unit is configured to obtain flow table loads of the multiple switches;

the determining unit is configured to determine a connection relationship between the multiple switches according to a network topology;

the determining unit is further configured to determine a weight of each forwarding path according to the connection relationship between the multiple switches and the flow table load of each switch of the multiple switches, where the forwarding path is a path between two directly connected switches; and the determining unit is further configured to determine a forwarding path for a data flow in the SDN according to the weight of each forwarding path, so that the SDN is in a load-balanced state.

With reference to the eighth aspect, in a first possible implementation of the eighth aspect, the determining unit includes a first determining subunit, a second determining subunit, and a third determining subunit, and the first determining subunit is configured to determine, each forwarding path according to the connection relationship between the multiple switches;

the second determining subunit is configured to determine switches included by each forwarding path; and the third determining subunit is configured to determine the weight of each forwarding path according to a flow table load of a target switch on each forwarding path, where the target switch is a switch that receives a data flow.

With reference to the first possible implementation of the eighth aspect, in a second possible implementation of the eighth aspect, the third determining subunit is configured to calculate the weight of each forwarding path according to the following calculation formula:

$$f(ij) = \begin{cases} 1 & 0 < t \le TH \\ Max \cdot e^{(t-TH)} & TH < t < 1 \end{cases},$$

where a flow table usage is used to represent the flow table load, TH is a preset flow table usage threshold, Max is a preset constant, f(ij) represents a weight of a forwarding path from a switch i to a switch j, t represents a flow table usage of the switch j, the switch i is among the multiple switches, and the switch j is among the multiple switches.

It can be learnt from the foregoing that, with reference to the data flow processing method and the switch provided in the first aspect and the fifth aspect, when a flow table load of the switch exceeds a preset threshold, the switch determines a diffusion target of a target data flow according to a matching rule of a diffusive flow table; and when the determined diffusion target is a neighboring switch of the switch, the switch forwards the target data flow to the neighboring switch. When the flow table load of the switch exceeds the preset threshold, the switch may have been attacked. A data flow that fails to be matched to a flow entry is forwarded to the neighboring switch according to a diffusion probability, for processing by the neighboring switch. This reduces a frequency at which the switch updates flow entries, improves a hit ratio of a normal data flow, and reduces a latency for forwarding a normal data flow.

It can be learnt from the foregoing that, with reference to the data flow processing method and the controller provided in the second aspect and the sixth aspect, the controller determines a first switch, and determines, according to a network topology, a second switch directly connected to the first switch; the controller obtains a flow table load of the second switch; the controller determines a diffusive flow table of the first switch according to the flow table load of the second switch; and the controller sends the diffusive flow table to the first switch, so that the switch can diffuse, to a neighboring switch according to the diffusive flow table, a data flow that fails to be matched to a flow entry, for processing by the neighboring switch. This lightens load of the first switch.

It can be learnt from the foregoing that, with reference to the data flow processing method and the switch provided in the third aspect and the seventh aspect, the switch monitors a flow table status of the switch; and when a flow table load of the switch exceeds a preset threshold, the switch forwards, to a neighboring switch according to a diffusion probability, a data flow that fails to be matched to a flow table of the switch. When the flow table load of the switch exceeds the preset threshold, the switch may have been attacked. Forwarding a data flow that fails to be matched to a flow table of the switch to the neighboring switch can lighten load of the switch, reduce a frequency at which the switch replaces flow entries, improve a hit ratio of a normal data flow, and reduce a latency.

It can be learnt from the foregoing that, with reference to the data flow processing method and the controller provided in the fourth aspect and the eighth aspect, the controller determines a weight of each forwarding path according to a connection relationship between multiple switches and a flow table load of each switch of the multiple switches; and the controller determines a forwarding path for a data flow in an SDN according to the weight of each forwarding path, so that the switch achieves a load-balanced state in a network topology. This improves data flow processing efficiency of the switch.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

SDN (Software-Defined Network, software-defined network) is a network architecture in which control and forwarding are separate. In the SDN architecture, control functions of network devices are abstracted to a controller, and the controller delivers flow entries to the network devices. The network device receives and stores the flow entry delivered by the controller, and operates a data flow according to the flow entry, for example, performing such operations as forwarding, dropping, and modifying the data flow.

Such data flow-based control of SDN makes extremely quick consumption of a flow table of a switch, while a hardware flow table of an SDN switch is generally implemented by using a TCAM (Ternary Content-Addressable Memory, ternary content-addressable memory). However, the TCAM has a limited capacity. Therefore, an attacker may forge a large quantity of data flows, so that the controller adds a large quantity of flow entries to the flow table of the switch, or even fills up the flow table of the switch. Because the flow table of the switch has a limited capacity, when no more flow entry can be added to the flow table of the switch, the switch needs to delete an existing flow entry to make room for a new flow entry.

However, because a flow entry of a normal data flow is replaced out of the switch with an attack flow entry, the normal data flow has no hit, and a latency for processing the normal data flow is increased.

Figure 1:
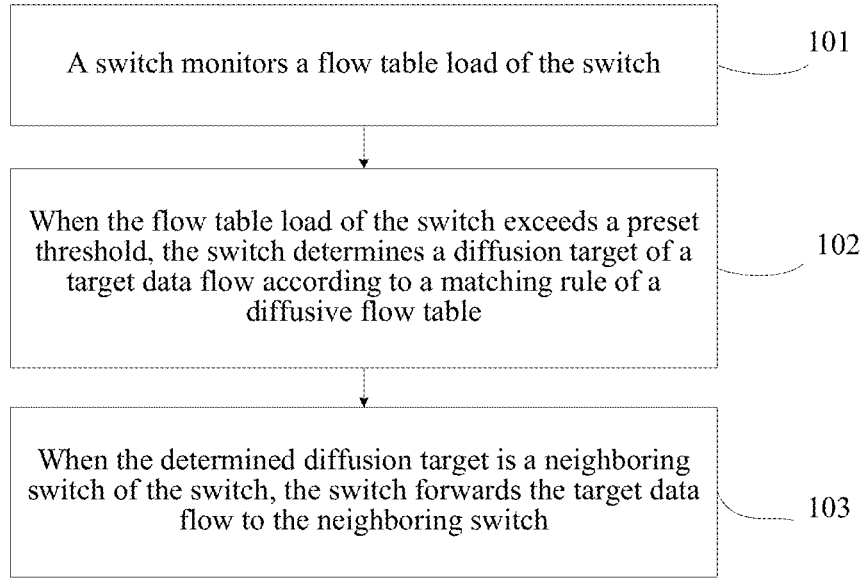
FIG. 1 illustrates a data flow processing method according to an embodiment of the present disclosure.

To address the foregoing issue, as shown in FIG. 1, an embodiment of the present disclosure provides a flow table processing method. The method is as follows:

101. A switch monitors a flow table load of the switch.

A quantity of flow entries in a flow table of the switch may indicate the flow table load.

The flow table load of the switch may be reflected by using a flow table usage. The flow table usage is a ratio of a capacity occupied by flow entries to a total capacity of the flow table.

Monitoring the flow table load of the switch may be understood as monitoring the flow table usage of the switch.

The flow table of the switch includes multiple flow entries, and each flow entry includes three parts. The three parts of the flow entry include a packet header field, a counter, and an action.

The packet header field is used for matching of packet header content of a packet received by the switch. The packet header field includes but is not limited to the following fields: a source MAC (Media Access Control, Media Access Control) address, a destination MAC address, an Ethernet type, a vlan id (virtual local area network identity, virtual local area network identity), an IP (Internet Protocol, Internet Protocol) type, a source IP address, a destination IP address, a source TCP (Transmission Control Protocol, Transmission Control Protocol) port number, a destination TCP port number, a source UDP (User Datagram Protocol, User Datagram Protocol) port number, a destination UDP port number, and the like. The packet header field is also referred to as a match field.

The counter is used to count a quantity of matched packets.

The action is used to instruct the switch how to process a received matched data packet, for example, forwarding or dropping.

102. When the flow table load of the switch exceeds a preset threshold, the switch determines a diffusion target of a target data flow according to a matching rule of a diffusive flow table, where the target data flow is a data flow that fails to be matched to a flow table of the switch, and the diffusive flow table is delivered by a controller.

That the flow table load of the switch exceeds the preset threshold includes that a quantity of flow entries in the flow table reaches a preset quantity. For example, the flow table can accommodate 1000 flow entries in total, and the preset quantity is set to 800. Then, when the quantity of flow entries in the flow table is greater than or equal to 800, the flow table load reaches the preset threshold.

Alternatively, that the flow table load of the switch exceeds the preset threshold includes that a flow table usage reaches a preset threshold. For example, assuming that the preset threshold is 70%, when the flow table usage is greater than or equal to 70%, a flow table load status reaches the preset threshold.

103. When the determined diffusion target is a neighboring switch of the switch, the switch forwards the target data flow to the neighboring switch.

When it is determined that the diffusion target is the neighboring switch, the switch does not send a packet_in request packet to the controller, to request a flow entry corresponding to the target data flow, but forward the target data flow to the neighboring switch for processing. This lightens load of the switch.

It can be learnt from the foregoing that, according to the data flow processing method provided in this embodiment of the present disclosure, when a flow table load of a switch exceeds a preset threshold, the switch determines a diffusion target of a target data flow according to a matching rule of a diffusive flow table; and when the determined diffusion target is a neighboring switch of the switch, the switch forwards the target data flow to the neighboring switch. When the flow table load of the switch exceeds the preset threshold, the switch may have been attacked. A data flow that fails to be matched to a flow entry is forwarded to the neighboring switch according to a diffusion probability, for processing by the neighboring switch. This reduces a frequency at which the switch updates flow entries, improves a hit ratio of a normal data flow, and reduces a latency for forwarding a normal data flow.

Optionally, based on the foregoing embodiment, in another embodiment of the present disclosure, the matching rule includes a correspondence between a port number of the switch and the diffusion target.

Before the determining a diffusion target of a target data flow according to a matching rule of a diffusive flow table, the method further includes:

determining, by the switch, a port number of an ingress port, where the ingress port is a port from which the switch receives the target data flow.

The determining, by the switch, a diffusion target of a target data flow according to a matching rule of a diffusive flow table includes:

determining, by the switch, the diffusion target of the target data flow according to the port number of the ingress port and the matching rule.

For example, the matching rule may be that a data flow received from an ingress port 1 is forwarded to the neighboring switch and that a data flow received from an ingress port 2 is processed by the switch.

Optionally, based on the foregoing embodiment, in another embodiment of the present disclosure, the matching rule includes a correspondence between a numeric interval and the diffusion target. One numeric interval is corresponding to one diffusion target, and the matching rule includes at least two numeric intervals.

Before the determining, by the switch, a diffusion target of a target data flow according to a matching rule of a diffusive flow table, the method further includes:

performing, by the switch, hash calculation on a packet header field of the target data flow to obtain a numeric value.

The determining, by the switch, a diffusion target of a target data flow according to a matching rule of a diffusive flow table includes:

determining, by the switch, a numeric interval that the numeric value is in; and determining, by the switch, the diffusion target according to the numeric interval and the matching rule.

For example, the matching rule may be that data flows with numeric values being 1 to 100 are forwarded to the neighboring switch and that data flows with numeric values being 101 to 200 are delivered to the controller for processing.

Optionally, based on the embodiment, in another embodiment of the present disclosure, after the switch determines the diffusion target of the target data flow according to the matching rule of the diffusive flow table, the method further includes:

when the determined diffusion target is the controller, requesting, by the switch, the controller for a flow entry that matches the target data flow.

The switch sends a message to the controller to obtain a flow entry that matches the target data flow.

In another embodiment of the present disclosure, the controller predefines the diffusive flow table, and deploys the diffusive flow table on the switch. The controller may deploy the diffusive flow table of the switch in advance. Alternatively, the controller may dynamically monitor the flow table load of the switch, and deliver the diffusive flow table when the flow table load of the switch reaches the preset threshold.

For example, when the flow table usage of the switch is greater than the preset threshold, for a data flow that fails to be matched to a flow entry, the switch does not send a request for processing to the controller, but sends, according to the diffusive flow table delivered by the controller, the data flow to the neighboring switch for further processing. Because a processing policy is also deployed on the neighboring switch in advance, the neighboring switch implements, according to the processing policy, a corresponding operation for the data flow, to ensure integrity of data flow processing. The neighboring switch may further diffuse the received data flow, or may send a request to the controller to obtain a flow entry corresponding to the data flow.

Figure 2:
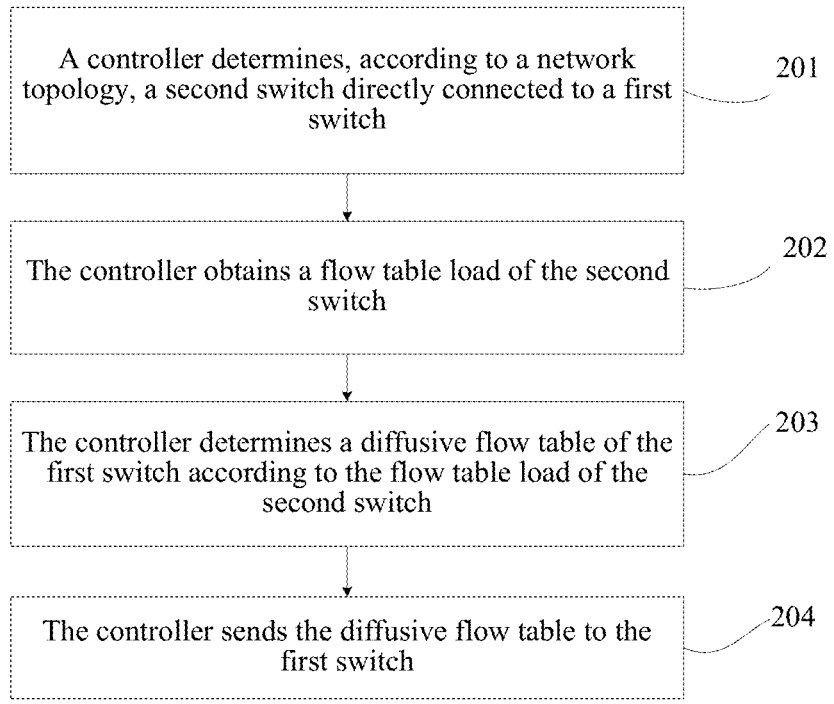
FIG. 2 illustrates a data flow processing method according to another embodiment of the present disclosure.

As shown in FIG. 2, an embodiment of the present disclosure provides another flow table processing method. The method is applied to an SDN network. The SDN includes a controller and multiple switches. The method includes the following steps.

201. The controller determines, according to a network topology, a second switch directly connected to a first switch, where the first switch is any switch of the multiple switches, the second switch is a switch other than the first switch in the multiple switches, and there is at least one second switch.

In the network topology, multiple switches are included, and there is a connection relationship between the switches.

202. The controller obtains a flow table load of the second switch.

The flow table load of the second switch is a flow table usage or a quantity of flow entries in a flow table. For example, that the flow table usage exceeds a threshold indicates that the flow table of the second switch is overloaded; that the quantity of flow entries in the flow table exceeds a preset quantity indicates that the flow table of the second switch is overloaded. Other examples are not listed one by one herein.

203. The controller determines a diffusive flow table of the first switch according to the flow table load of the second switch.

204. The controller sends the diffusive flow table to the first switch.

It can be learnt from the foregoing that, by using the flow table processing method provided in this embodiment of the present disclosure, the controller determines a diffusive flow table of the first switch according to a flow table load of the second switch; and the controller sends the diffusive flow table to the first switch, so that the first switch can forward a received data flow to a neighboring switch according to the diffusive flow table, for processing by the neighboring switch. This lightens load of the first switch.

Optionally, based on the embodiment described in FIG. 2, step 203 in which the controller determines the diffusive flow table of the first switch according to the flow table load of the second switch includes the following steps:

205. The controller determines a forwarding path of the first switch according to a connection relationship between the first switch and the second switch, where the forwarding path is a path between the first switch and the second switch.

206. The controller determines a diffusion probability of each forwarding path according to a flow table load of the second switch on each forwarding path.

207. The controller determines the diffusive flow table of the first switch according to the diffusion probability of each forwarding path.

One switch may be connected to multiple switches, and therefore, multiple forwarding paths are formed. For example, there are four switches: a switch A, a switch B, a switch C, and a switch D. The switch A is connected to all the other three switches. The switch A is a source switch, and the other three switches are target switches. Therefore, three forwarding paths are formed: a first forwarding path from the switch A to the switch B, a second path from the switch A to the switch C, and a third path from the switch A to the switch D. The switch A is on all the three forwarding paths; and the switch B, the switch C, and the switch D are target switches on the forwarding paths on which the switch A is located.

A flow table status is a quantity of flow entries in a flow table or a flow table usage.

A lower flow table usage of a target switch indicates a higher diffusion probability of a forwarding path on which the target switch is located. A purpose of this is to achieve load balancing on each switch.

For example, a flow table usage of the switch B is 30%, a flow table usage of the switch C is 40%, and a flow table usage of the switch D is 40%. The switch A may set a diffusion probability of the forwarding path from the switch A to the switch B to 30%, a diffusion probability of the forwarding path from the switch A to the switch C to 20%, a diffusion probability of the forwarding path from the switch A to the switch D to 20%, and a diffusion probability of the forwarding path from the switch A to the controller to 30%.

Optionally, based on the foregoing embodiment, in another embodiment of the present disclosure, step 207 in which the controller determines the diffusive flow table of the first switch according to the diffusion probability of each forwarding path includes the following steps.

2071. The controller determines, according to the diffusion probability of each forwarding path, a quantity of egress ports of the first switch corresponding to each forwarding path, where the egress ports of the first switch are configured to forward data flows.

A forwarding path with a higher diffusion probability is corresponding to more egress ports.

For example, a switch A is connected to all a switch B, a switch C, and a switch D. The switch A is a source switch; and the switch B, the switch C, and the switch D are target switches.

A first forwarding path is from the switch A to the switch B, and a diffusion probability of the first forwarding path is 40%.

A second forwarding path is from the switch A to the switch C, and a diffusion probability of the second forwarding path is 20%.

A third forwarding path is from the switch A to the switch D, and a diffusion probability of the third forwarding path is 20%.

Therefore, the switch A is corresponding to two egress ports, the switch B is corresponding to one egress port, and the switch C is corresponding to one egress port. The switch A may set that the first forwarding path is corresponding to a first port and a second port of the switch A, that the second forwarding path is corresponding to a third port of the switch A, and that the third forwarding path is corresponding to a fourth port of the switch A.

2072. The controller determines the diffusive flow table of the first switch according to each forwarding path and the quantity of egress ports of the first switch corresponding to each forwarding path.

Optionally, based on the foregoing embodiment, in another embodiment of the present disclosure, step 207 in which the controller determines a diffusive flow table of each source switch according to the diffusion probability of each forwarding path on which each source switch is located includes the following steps.

2073. The controller determines, according to the diffusion probability of each forwarding path, a numeric interval corresponding to each forwarding path.

A forwarding path with a higher diffusion probability indicates a wider numeric interval.

For example, a switch A is connected to all a switch B, a switch C, and a switch D. The switch A is a source switch; and the switch B, the switch C, and the switch D are target switches.

A first forwarding path is from the switch A to the switch B, and a diffusion probability of the first forwarding path is 40%.

A second forwarding path is from the switch A to the switch C, and a diffusion probability of the second forwarding path is 20%.

A third forwarding path is from the switch A to the switch D, and a diffusion probability of the third forwarding path is 20%.

The first forwarding path may be corresponding to a numeric interval from 0 to 100, the second forwarding path may be corresponding to a numeric interval from 101 to 150, and the third forwarding path may be corresponding to a numeric interval from 150 to 200.

2074. The controller determines the diffusive flow table of the first switch according to each forwarding path and the numeric interval corresponding to each forwarding path.

A format of the diffusive flow table is not limited, and may be consistent with a format of the flow table of the switch.

In another embodiment of the present disclosure, when the flow table usage of the switch exceeds a preset threshold (being 70% in the figure), a data flow that is unsuccessfully matched is forwarded according to the diffusive flow table. The diffusive flow table includes two diffusion manners. One is diffusion to the neighboring switch (in the figure, diffusion to the switch B and the switch C), and the other is diffusion to the controller (that is, the controller in the figure).

Figure 3:
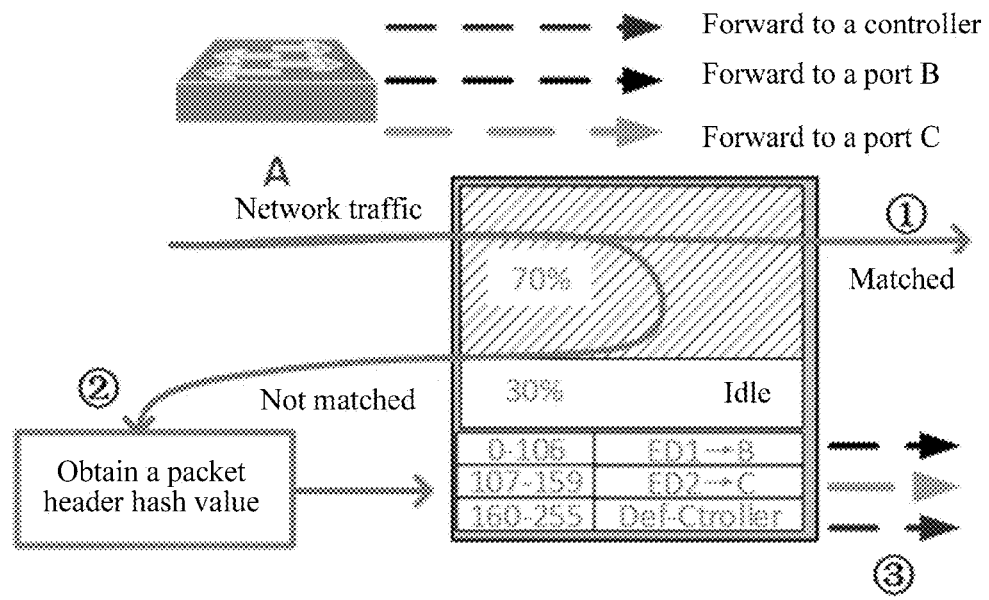
FIG. 3 illustrates a data flow processing method according to another embodiment of the present disclosure.

As shown in FIG. 3, for a data flow that fails to be matched to a flow table, the switch performs hash calculation on a packet header field of the data flow to obtain a hash value of the data flow. The hash value is a number. Data flows with an equal hash value are considered as one flow.

The diffusive flow table includes multiple diffusion rules. Each diffusion rule is corresponding to a numeric range. If a hash value of a data flow falls within the numeric range, diffusion is performed according to a diffusion rule corresponding to the numeric range.

A diffusion rule 1 is corresponding to a numeric range from 0 to 106, and a forwarding rule corresponding to the numeric range is forwarding to the neighboring switch B. If a hash value of a data flow falls within the range from 0 to 106, the switch diffuses the data flow to the neighboring switch B. A diffusion rule 3 is corresponding to a numeric range from 160 to 255, and a forwarding rule corresponding to the numeric range is forwarding to the controller. If a hash value of a data flow falls within the range from 160 to 255, the switch diffuses the data flow to the controller.

Figure 4:
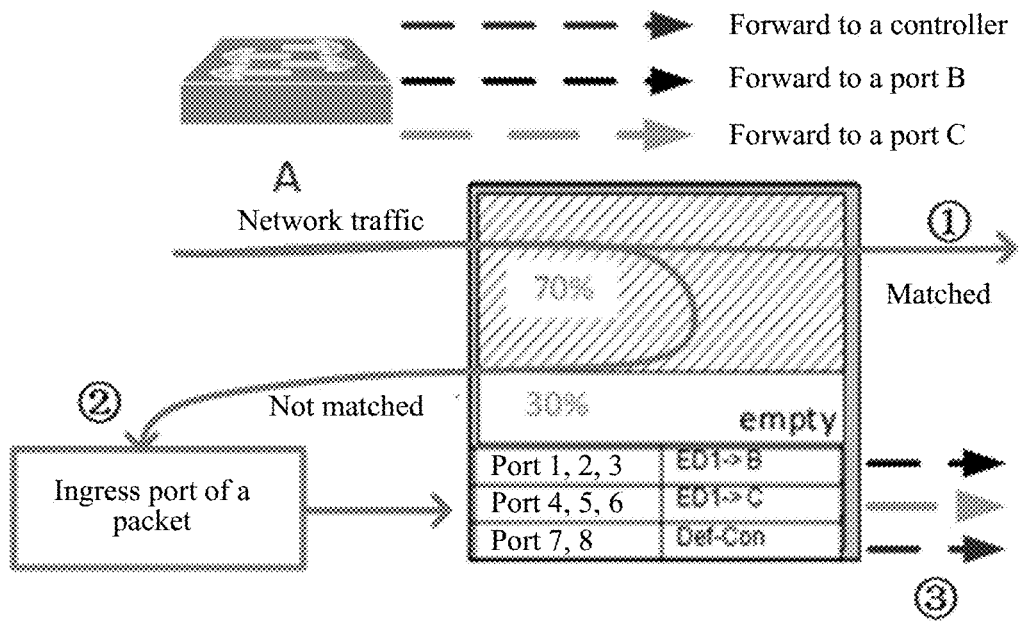
FIG. 4 illustrates a data flow processing method according to another embodiment of the present disclosure.

As shown in FIG. 4, for a data flow that fails to be matched to a flow table, the switch performs forwarding according to an ingress port of the data flow and a diffusion rule. For example, data flows flowing in from a port 1, a port 2, and a port 3 are diffused to the switch B according to a diffusion rule 1; data flows flowing in from a port 4, a port 5, and a port 6 are diffused to the switch C according to a diffusion rule 2; and data flows flowing in from a port 7 and a port 8 are diffused to the controller according to a diffusion rule 3.

Figure 5:
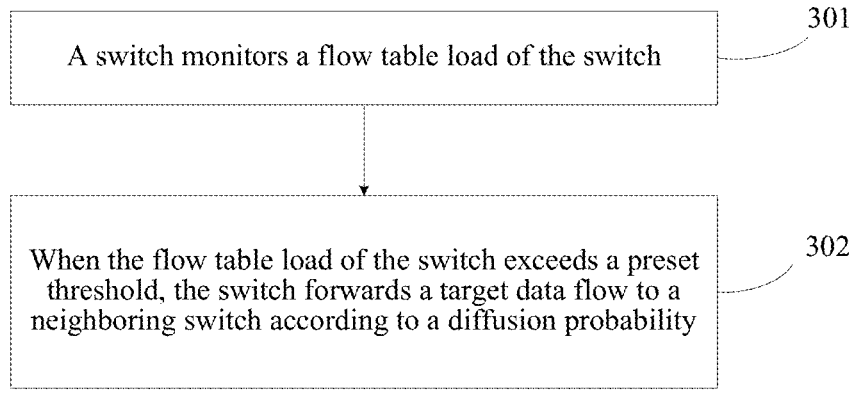
FIG. 5 illustrates a data flow processing method according to another embodiment of the present disclosure.

As shown in FIG. 5, an embodiment of the present disclosure provides another flow table processing method. The method is applied to an SDN network, and the method includes the following steps.

301. A switch monitors a flow table load of the switch.

The flow table load may be a quantity of flow entries in a flow table, or may be a flow table usage.

302. When the flow table load of the switch exceeds a preset threshold, the switch forwards a target data flow to a neighboring switch according to a diffusion probability, where the target data flow is a data flow that fails to be matched to a flow table of the switch.

That the flow table status is a preset status includes that the quantity of flow entries in the flow table reaches a preset quantity. For example, the flow table can accommodate 1000 flow entries in total, and the preset quantity is set to 800. Then, when the quantity of flow entries in the flow table is greater than or equal to 800, the flow table status reaches the preset status.

Alternatively, that the flow table status is a preset status includes that the flow table usage reaches a preset value. For example, assuming that the preset value is 70%, when the flow table usage is greater than or equal to 70%, the flow table status is the preset status.

It can be learnt from the foregoing that, according to the method provided in this embodiment of the present disclosure, the switch monitors a flow table status of the switch; and when a flow table load of the switch exceeds a preset threshold, the switch forwards, to a neighboring switch according to a diffusion probability, a data flow that fails to be matched to a flow table of the switch. When the flow table load of the switch exceeds the preset threshold, the switch may have been attacked. Forwarding a data flow that fails to be matched to a flow table of the switch to the neighboring switch can lighten load of the switch, reduce a frequency at which the switch replaces flow entries, improve a hit ratio of a normal data flow, and reduce a latency.

Optionally, based on the foregoing embodiment, in another embodiment of the present disclosure, before the switch diffuses a target data flow to the neighboring switch according to the diffusion probability, the method further includes:

calculating, by the switch, the diffusion probability according to the following formula:

$$Ps = P\max \times \frac{\mathrm{avg} - \mathrm{min}_{thresh}}{\mathrm{max}_{thresh} - \mathrm{min}_{thresh}} + P\min,$$

where $P_S$ is the diffusion probability, $P_{max}$ is a preset maximum diffusion probability, Pmin is a preset minimum probability, avg is the flow table usage, maxthresh is a first threshold, minthresh is a second threshold, and the first threshold is greater than the second threshold.

Optionally, based on the foregoing embodiment, in another embodiment of the present disclosure, the method further includes:

when the flow table usage of the switch is greater than the first threshold, the switch forwards the target data flow to the neighboring switch according to the preset maximum diffusion probability.

Figure 6A:
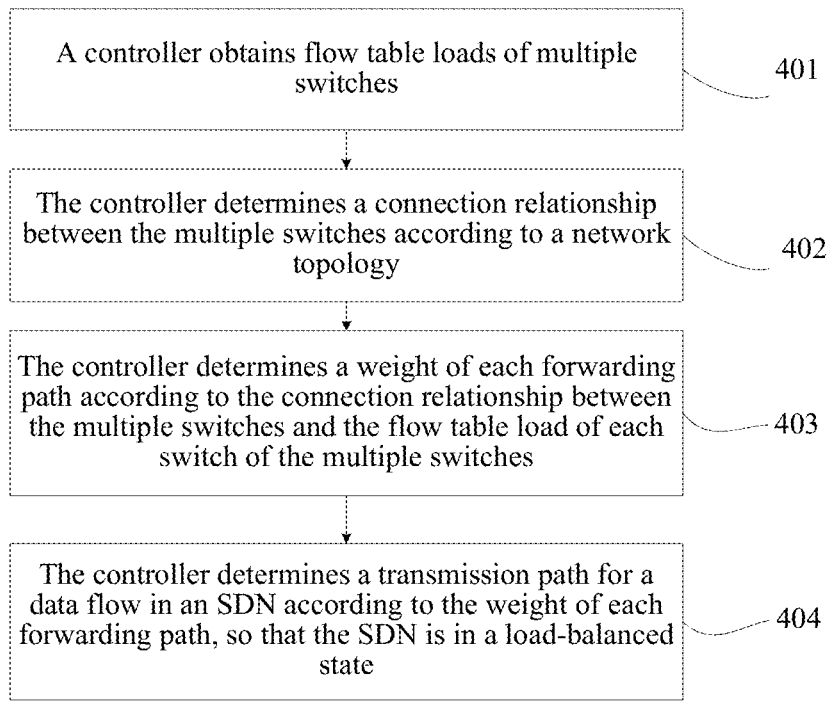
FIG. 6a illustrates a data flow processing method according to another embodiment of the present disclosure.

As shown in FIG. 6a, an embodiment of the present disclosure provides another flow table processing method. The method is applied to an SDN network. The SDN includes a controller and multiple switches. The method includes the following steps.

401. The controller obtains flow table loads of the multiple switches.

The flow table load is a flow table usage. The flow table usage is a ratio of space occupied by flow entries to a flow table capacity.

Alternatively, the flow table load may be a quantity of flow entries in a flow table.

For example, if the flow table usage exceeds a preset value, it indicates that the flow table of the switch is overloaded, or that the switch may have been attacked.

402. The controller determines a connection relationship between the multiple switches according to a network topology.

In the network topology, multiple switches are included, and there is a connection relationship between the switches.

403. The controller determines a weight of each forwarding path according to the connection relationship between the multiple switches and the flow table load of each switch of the multiple switches, where the forwarding path is a path between two directly connected switches.

404. The controller determines a forwarding path for a data flow in the SDN according to the weight of each forwarding path, so that the SDN is in a load-balanced state.

It can be learnt from the foregoing that, according to the data flow processing method provided in this embodiment of the present disclosure, the controller determines a weight of each forwarding path according to a connection relationship between multiple switches and a flow table load of each switch of the multiple switches; and the controller determines a forwarding path for a data flow in an SDN according to the weight of each forwarding path, so that the switch achieves a load-balanced state in a network topology. This improves data flow processing efficiency of the switch.

Optionally, based on the foregoing embodiment, in another embodiment of the present disclosure, step 403 in which the controller determines the weight of each forwarding path according to the connection relationship between the multiple switches and the flow table load of each switch of the multiple switches includes:

4031. The controller determines each forwarding path according to the connection relationship between the multiple switches.

One switch may be connected to multiple switches, and therefore, multiple forwarding paths are formed. For example, there are four switches: a switch A, a switch B, a switch C, and a switch D. The switch A is connected to all the other three switches. The switch A is a source switch, and the other three switches are target switches. Therefore, three forwarding paths are formed: a first forwarding path from the switch A to the switch B, a second path from the switch A to the switch C, and a third path from the switch A to the switch D.

4032. The controller determines switches included by each forwarding path.

The switch A is on all the three forwarding paths; and the switch B, the switch C, and the switch D are target switches on the forwarding paths on which the switch A is located.

4033. The controller determines the weight of each forwarding path according to a flow table load of a target switch on each forwarding path, where the target switch is a switch that receives a data flow.

Generally, a flow table usage or a quantity of flow entries in the flow table is used to represent a flow table status.

A higher flow table usage of a target switch indicates a greater weight of a forwarding path on which the target switch is located. A greater weight of the forwarding path indicates a higher overhead of the forwarding path. The controller selects a path with a lower overhead as a forwarding path. Therefore, the controller can actively avoid that a data flow passes through a switch node with a greater weight, and select a switch with a lower flow table usage to transmit the data flow.

Optionally, based on the foregoing embodiment, in another embodiment of the present disclosure, that the controller determines the weight of each forwarding path according to the flow table usage of the target switch on each forwarding path includes:

calculating, by the controller, the weight of each forwarding path according to the following calculation formula:

$$f(ij) = \begin{cases} 1 & 0 < t \leq TH \\ Max \cdot e^{(t-TH)} & TH < t < 1 \end{cases},$$

where a flow table usage is used to represent the flow table load, TH is a preset flow table usage threshold, Max is a preset constant, f(ij) represents a weight of a forwarding path from a switch i to a switch j, t represents a flow table usage of the switch j, the switch i is among the multiple switches, and the switch j is among the multiple switches.

Max is a constant that may be set according to an ambient requirement, representing a reachable maximum overhead of the forwarding path. When a flow table usage of a switch is less than TH, a weighting coefficient is 1, indicating that an actual overhead of the path is equal to a weighted overhead of the path. When a usage of a switch node is greater than TH, a weighting coefficient is $Max \cdot e^{(t-TH)}$, indicating that a higher usage yields a greater weight value, where the weight value may reach Max at maximum.

According to the weighting algorithm, a transmission overhead of any forwarding path on a network may be obtained through calculation. A specific method for calculating path costs of all forwarding paths on a network is as follows:

Step 1. Divide a set V of fixed points in a switch network topology into two groups, where each fixed point represents a switch:

(1) S: a set of determined fixed points (where there is only a start point v0 initially)

(2) V−S=T: a set of undetermined fixed points

Step 2. Add a smallest-numbered fixed point in T to S each time, ensuring that a length from the source point v0 to each fixed point in S is not greater than a shortest path length from the source point v0 to any fixed point in T. A point closest to the point v0 is found from points not added to S. Dist[] stores a found shortest path starting from the point v0.

Step 3. Repeat step 2 until there is no element in T, which means that all fixed points are traversed. A shortest path between every two fixed points is obtained.

Figure 6B:
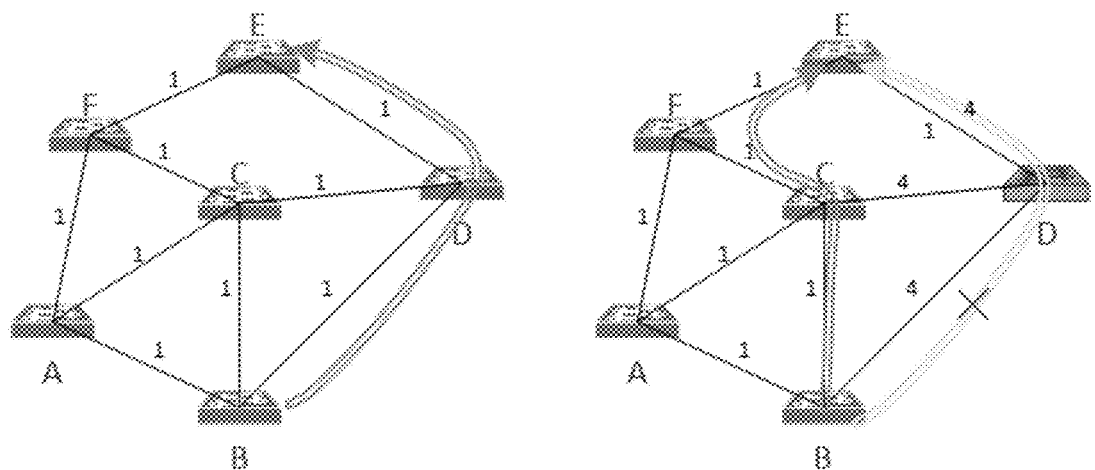
FIG. 6b illustrates a data flow processing method according to another embodiment of the present disclosure.

In an embodiment of the present disclosure, as shown in FIG. 6b, the network includes six switches, and it is assumed that all forwarding path distances are initially 1. In a left diagram, an optimal path for a flow of a switch B to arrive at a switch E is B→D→E, whose distance length is 2. After a period of time elapses, a flow table usage of the switch D reaches TH, and it is assumed that new lengths from neighboring switches of D to D are calculated based on the prior forwarding path lengths. The new lengths are marked in a right diagram. It is found that a total length of the original path has become 4+1=5 (B→D→E), and that a distance-vector from the switch D to the switch E remains 1. However, a path length of a path (B→C→F→E) is 1+1+1=3<5. Therefore, when there is new traffic, the controller will adjust routing in time.

Figure 7:
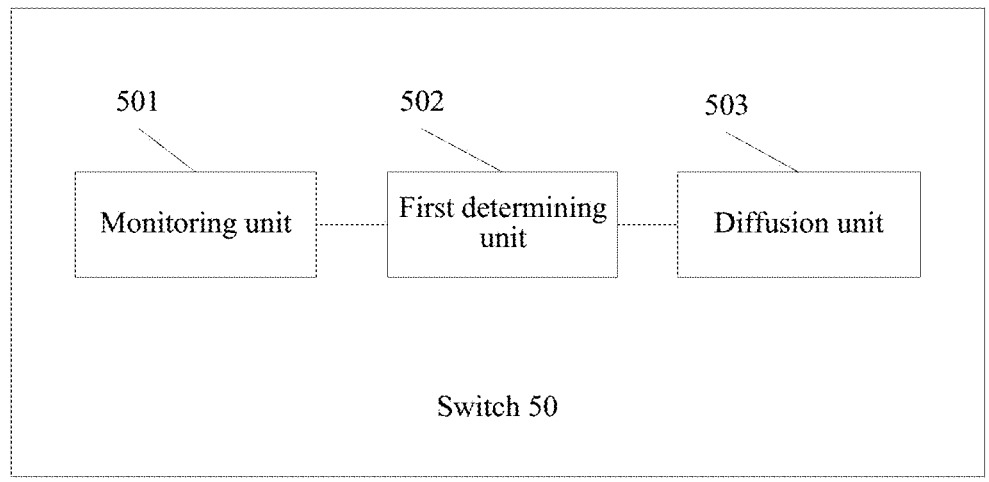
FIG. 7 illustrates a switch according to an embodiment of the present disclosure.

As shown in FIG. 7, an embodiment of the present disclosure provides a switch 50. The switch is applied to an SDN network. The switch 50 includes a monitoring unit 501, a first determining unit 502, and a diffusion unit 503.

The monitoring unit 501 is configured to monitor a flow table load of the switch.

The flow table load of the switch may be a quantity of flow entries in a flow table of the switch.

Alternatively, the flow table load of the switch may be a flow table usage. The flow table usage is a ratio of a capacity occupied by flow entries to a total capacity of the flow table.

The first determining unit 502 is configured to: when the flow table load of the switch exceeds a preset threshold, determine, a diffusion target of a target data flow according to a matching rule of a diffusive flow table. The target data flow is a data flow that fails to be matched to a flow table of the switch, and the diffusive flow table is delivered by a controller.

For example, the flow table can accommodate 1000 flow entries in total, and a preset quantity is set to 800. Then, when the quantity of flow entries in the flow table is greater than or equal to 800, the flow table load exceeds the preset threshold.

For example, assuming that the preset value is 70%, when the flow table usage is greater than or equal to 70%, the flow table load exceeds the preset threshold.

The diffusion unit 503 is configured to: when the determined diffusion target is a neighboring switch of the switch, forward, the target data flow to the neighboring switch.

It can be learnt from the foregoing that, according to the switch provided in this embodiment of the present disclosure, when a flow table load of the switch exceeds a preset threshold, the switch determines a diffusion target of a target data flow according to a matching rule of a diffusive flow table; and when the determined diffusion target is a neighboring switch of the switch, the switch forwards the target data flow to the neighboring switch. When the flow table load of the switch exceeds the preset threshold, the switch may have been attacked. A data flow that fails to be matched to a flow entry is forwarded to the neighboring switch according to a diffusion probability, for processing by the neighboring switch. This reduces a frequency at which the switch updates flow entries, improves a hit ratio of a normal data flow, and reduces a latency for forwarding a normal data flow. Optionally, based on the switch 50, the matching rule includes a correspondence between a port number of the switch 50 and the diffusion target. The switch 50 further includes a second determining unit 504.

The second determining unit 504 is configured to determine a port number of an ingress port. The ingress port is a port from which the switch receives the target data flow.

The first determining unit 502 is configured to determine the diffusion target of the target data flow according to the port number of the ingress port and the matching rule.

For example, the matching rule may be that a data flow received from a port 1 is forwarded to the neighboring switch and that a data flow received from a port 2 is processed by the switch.

Optionally, based on the switch 50, the matching rule includes a correspondence between a numeric interval and the diffusion target. One numeric interval is corresponding to one diffusion target, and the matching rule includes at least two numeric intervals. The switch 50 further includes a hash unit 505.

The hash unit 505 is configured to perform hash calculation on a packet header field of the target data flow to obtain a numeric value.

The first determining unit 502 is configured to determine a numeric interval that the numeric value is in, and determine the diffusion target according to the numeric interval and the matching rule.

For example, the matching rule may be that data flows with numeric values being 1 to 100 are diffused to the neighboring switch and that data flows with numeric values being 101 to 200 are delivered to the controller for processing.

Optionally, based on the switch 50, the first determining unit 502 is further configured to: when the determined diffusion target is the controller, request the controller for a flow entry that matches the target data flow.

Figure 8:
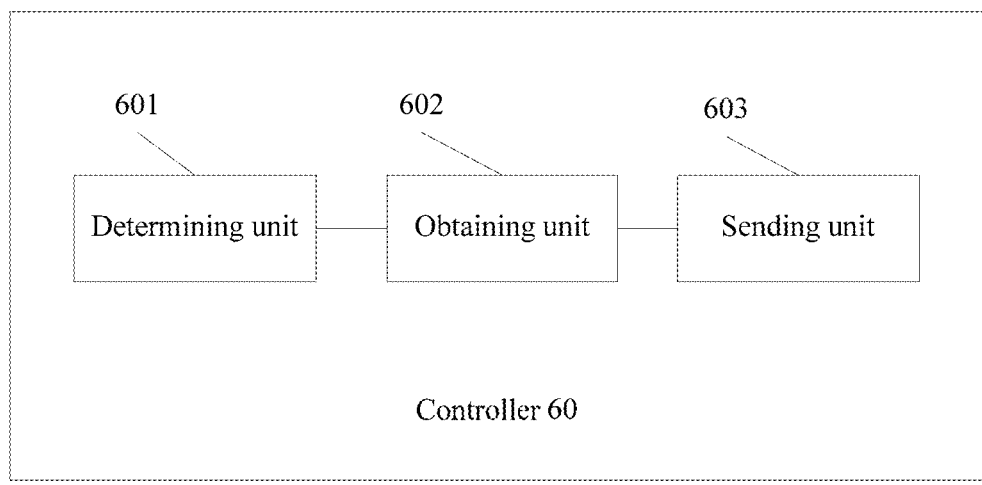
FIG. 8 illustrates a controller according to an embodiment of the present disclosure.

As shown in FIG. 8, an embodiment of the present disclosure provides a controller 60. The controller 60 is applied to an SDN network. The controller 60 includes a determining unit 601, an obtaining unit 602, and a sending unit 603.

The determining unit 601 is configured to determine, according to a network topology, a second switch directly connected to a first switch. The first switch is any switch of multiple switches, the second switch is a switch other than the first switch in the multiple switches, and there is at least one second switch.

In the network topology, multiple switches are included, and there is a connection relationship between the switches.

The obtaining unit 602 is configured to obtain a flow table load of the second switch.

The determining unit 601 is further configured to determine a diffusive flow table of the first switch according to the flow table load of the second switch.

The sending unit 603 is configured to send the diffusive flow table to the first switch.

It can be learnt from the foregoing that, according to the controller provided in this embodiment of the present disclosure, the controller determines a first switch, and determines, according to a network topology, a second switch directly connected to the first switch; the controller obtains a flow table load of the second switch; the controller determines a diffusive flow table of the first switch according to the flow table load of the second switch; and the controller sends the diffusive flow table to the first switch, so that the switch can diffuse, to a neighboring switch according to the diffusive flow table, a data flow that fails to be matched to a flow entry, for processing by the neighboring switch. This lightens load of the first switch.

Optionally, based on the controller 60, the determining unit 602 includes a first determining subunit 6021, a second determining subunit 6022, and a third determining subunit 6023.

The first determining subunit 6021 is configured to determine a forwarding path of the first switch according to a connection relationship between the first switch and the second switch. The forwarding path is a path between the first switch and the second switch.

The second determining subunit 6022 is configured to determine a diffusion probability of each forwarding path according to a flow table load of the second switch on each forwarding path.

The third determining subunit 6023 is configured to determine the diffusive flow table of the first switch according to the diffusion probability of each forwarding path.

Optionally, based on the controller 60, the third determining subunit 6023 is configured to determine, according to the diffusion probability of each forwarding path, a quantity of egress ports of the first switch corresponding to each forwarding path. The egress ports of the first switch are configured to forward data flows.

The third determining subunit 6023 is further configured to determine the diffusive flow table of the first switch according to each forwarding path and the quantity of egress ports of the first switch corresponding to each forwarding path.

Optionally, based on the controller 60, the third determining subunit 6023 is configured to determine, according to the diffusion probability of each forwarding path, a numeric interval corresponding to each forwarding path; and the third determining subunit 6023 is further configured to determine the diffusive flow table of the first switch according to each forwarding path and the numeric interval corresponding to each forwarding path.

Figure 9:
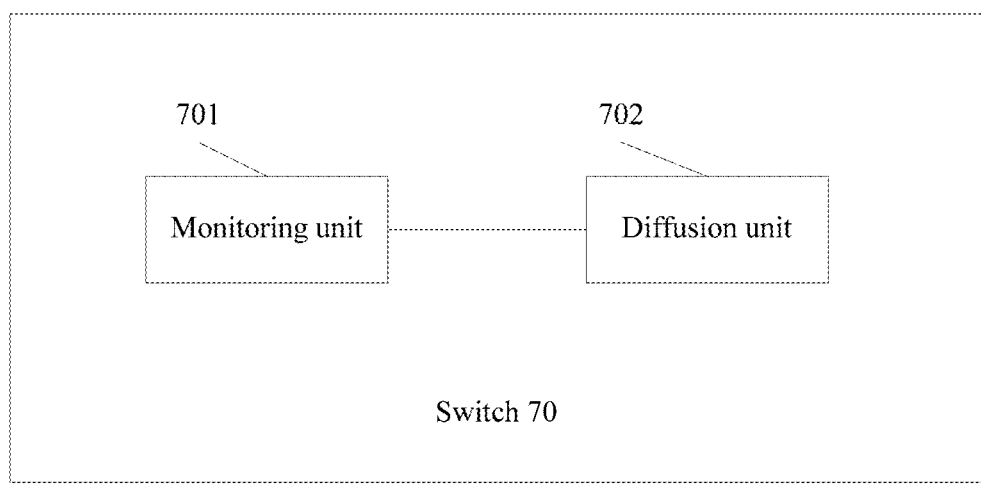
FIG. 9 illustrates a switch according to another embodiment of the present disclosure.

As shown in FIG. 9, an embodiment of the present disclosure provides a switch 70. The switch 70 includes a monitoring unit 701 and a diffusion unit 702.

The monitoring unit 701 is configured to monitor a flow table load of the switch.

The flow table load of the switch is a flow table usage of the switch, or a quantity of flow entries in a flow table of the switch, or the like.

The diffusion unit 702 is configured to: when the flow table load of the switch exceeds a preset threshold, forward, a target data flow to a neighboring switch according to a diffusion probability. The target data flow is a data flow that fails to be matched to the flow table of the switch.

It can be learnt from the foregoing that, according to the switch provided in this embodiment of the present disclosure, the switch monitors a flow table status of the switch; and when a flow table load of the switch exceeds a preset threshold, the switch forwards, to a neighboring switch according to a diffusion probability, a data flow that fails to be matched to a flow table of the switch. When the flow table load of the switch exceeds the preset threshold, the switch may have been attacked. Forwarding a data flow that fails to be matched to a flow table of the switch to the neighboring switch can lighten load of the switch, reduce a frequency at which the switch replaces flow entries, improve a hit ratio of a normal data flow, and reduce a latency.

Optionally, based on the switch 70, the determining unit 601 is configured to calculate the diffusion probability according to the following formula:

$$Ps = P\max \times \frac{\text{avg} - \text{min}thresh}{\text{max}thresh - \text{min}thresh} + P\min,$$

a flow table usage is used to represent the flow table status, Ps is the diffusion probability, $P_{max}$ is a preset maximum diffusion probability, Pmin is a preset minimum probability, avg is the flow table usage, maxthresh is a first threshold, minthresh is a second threshold, and the first threshold is greater than the second threshold.

Optionally, based on the switch 70, the diffusion unit 702 is further configured to: when the flow table usage is greater than the first threshold, the switch forwards the target data flow to the neighboring switch according to the preset maximum diffusion probability.

Figure 10:
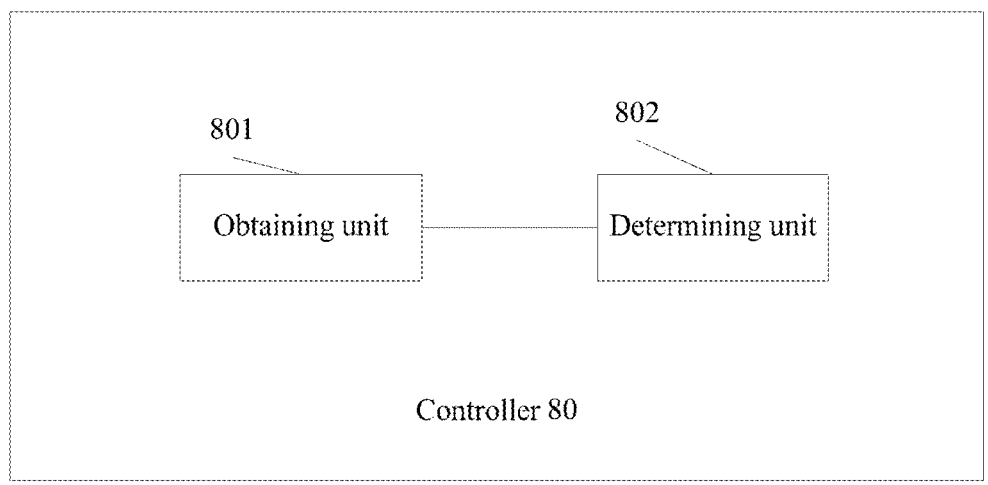
FIG. 10 illustrates a server according to another embodiment of the present disclosure.

As shown in FIG. 10, an embodiment of the present disclosure provides a controller 80. The controller 80 includes an obtaining unit 801 and a determining unit 802.

The obtaining unit 801 is configured to obtain flow table loads of multiple switches.

The flow table load of the switch is a flow table usage or a quantity of flow entries in a flow table.

The determining unit 802 is configured to determine a connection relationship between the multiple switches according to a network topology.

The determining unit 802 is further configured to determine a weight of each forwarding path according to the connection relationship between the multiple switches and the flow table load of each switch of the multiple switches. The forwarding path is a path between two directly connected switches.

The determining unit 802 is further configured to determine a forwarding path for a data flow in an SDN according to the weight of each forwarding path, so that the SDN is in a load-balanced state.

It can be learnt from the foregoing that, according to the controller provided in this embodiment of the present disclosure, the controller determines a weight of each forwarding path according to a connection relationship between multiple switches and a flow table load of each switch of the multiple switches; and the controller determines a forwarding path for a data flow in an SDN according to the weight of each forwarding path, so that a switch achieves a load-balanced state in a network topology. This improves data flow processing efficiency of the switch.

Optionally, based on the controller 80, the determining unit 802 includes a first determining subunit 8021, a second determining subunit 8022, and a third determining subunit 8023.

Specifically, the first determining subunit 8021 is configured to determine each forwarding path according to a connection relationship between the multiple switches.

The second determining subunit 8022 is configured to determine switches included by each forwarding path.

The third determining subunit 8023 is configured to determine a weight of each forwarding path according to a flow table load of a target switch on each forwarding path. The target switch is a switch that receives a data flow.

Optionally, based on the controller 80, the third determining subunit 8023 is configured to calculate the weight of each forwarding path according to the following calculation formula:

$$f(ij) = \begin{cases} 1 & 0 < t \le TH \\ \text{Max} \cdot e^{(t-TH)} & TH < t < 1 \end{cases},$$

where

TH is a preset flow table usage threshold, Max is a preset constant, f(ij) represents a weight of a forwarding path from a switch i to a switch j, t represents a flow table usage of the switch j, the switch i is among the multiple switches, and the switch j is among the multiple switches.

Figure 11:
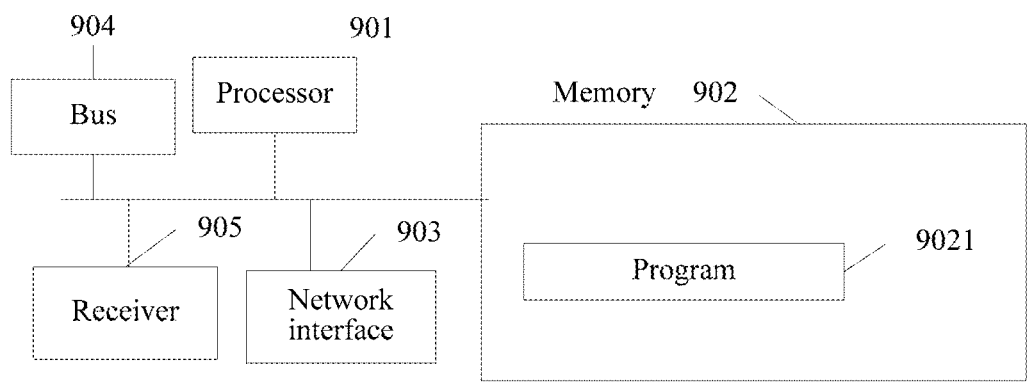
FIG. 11 illustrates a switch according to another embodiment of the present disclosure.

FIG. 11 illustrates a structure of a switch according to another embodiment of the present disclosure. The switch includes at least one processor 901 (for example, CPU), a memory 902, at least one network interface 903, at least one communications bus 904, and at least one receiver 905. The communications bus 904 is configured to implement communication connections between these apparatuses. The processor 901 is configured to execute an executable module, such as a computer program, stored in the memory 902. The memory 902 may include a high-speed random access memory (RAM: Random Access Memory), or may include a non-volatile memory (non-volatile memory), for example, at least an eMMC (Embedded Multi Media Card, embedded multimedia card) memory. A communication connection between the network device and at least one another network element is implemented by using the at least one network interface 903 (which may be wired or wireless).

In some implementations, the memory 902 stores a program 9021, and the program 9021 may be executed by the processor 901. The program includes instructions that can be executed to perform method that comprises:

monitoring a flow table load of the switch;

when the flow table load of the switch exceeds a preset threshold, determining a diffusion target of a target data flow according to a matching rule of a diffusive flow table, where the target data flow is a data flow that fails to be matched to a flow table of the switch, and the diffusive flow table is delivered by a controller; and when the determined diffusion target is a neighboring switch of the switch, forwarding the target data flow to the neighboring switch.

Optionally, the matching rule includes a correspondence between a port number of the switch and the diffusion target.

Before the determining a diffusion target of a target data flow according to a matching rule of a diffusive flow table, the method further includes:

determining a port number of an ingress port, where the ingress port is a port from which the switch receives the target data flow.

The determining a diffusion target of a target data flow according to a matching rule of a diffusive flow table includes:

determining the diffusion target of the target data flow according to the port number of the ingress port and the matching rule.

Optionally, the matching rule includes a correspondence between a numeric interval and the diffusion target. One numeric interval is corresponding to one diffusion target, and the matching rule includes at least two numeric intervals.

Before the determining a diffusion target of a target data flow according to a matching rule of a diffusive flow table, the method further includes:

performing hash calculation on a packet header field of the target data flow to obtain a numeric value.

The determining a diffusion target of a target data flow according to a matching rule of a diffusive flow table includes:

determining a numeric interval that the numeric value is in; and determining the diffusion target according to the numeric interval and the matching rule.

Optionally, the method further includes: when the determined diffusion target is the controller, requesting, by the switch, the controller for a flow entry that matches the target data flow.

Specific implementation steps are the same as those in the embodiment shown in FIG. 1. Details are not described herein again.

It can be learnt from the foregoing that, according to the switch provided in this embodiment of the present disclosure, when a flow table load of the switch exceeds a preset threshold, the switch determines a diffusion target of a target data flow according to a matching rule of a diffusive flow table; and when the determined diffusion target is a neighboring switch of the switch, the switch forwards the target data flow to the neighboring switch. When the flow table load of the switch exceeds the preset threshold, the switch may have been attacked. A data flow that fails to be matched to a flow entry is forwarded to the neighboring switch according to a diffusion probability, for processing by the neighboring switch. This reduces a frequency at which the switch updates flow entries, improves a hit ratio of a normal data flow, and reduces a latency for forwarding a normal data flow.

Figure 12:
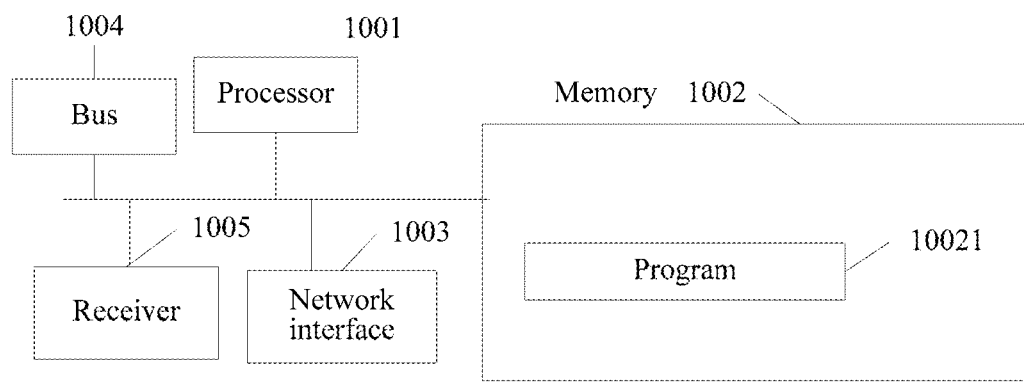
FIG. 12 illustrates a server according to another embodiment of the present disclosure.

FIG. 12 illustrates a structure of a controller according to another embodiment of the present disclosure. The controller includes at least one processor 1001 (for example, CPU), a memory 1002, at least one network interface 1003, at least one communications bus 1004, and at least one receiver 1005. The communications bus 1004 is configured to implement communication connections between these apparatuses. The processor 1001 is configured to execute an executable module, such as a computer program, stored in the memory 1002. The memory 1002 may include a high-speed random access memory (RAM: Random Access Memory), or may include a non-volatile memory (non-volatile memory), for example, at least an eMMC (Embedded Multi Media Card, embedded multimedia card) memory. A communication connection between the network device and at least one another network element is implemented by using the at least one network interface 1003 (which may be wired or wireless).

In some implementations, the memory 1002 stores a program 10021, and the program 10021 may be executed by the processor 1001. The program includes:

determining, according to a network topology, a second switch directly connected to a first switch, where the first switch is any switch of multiple switches, the second switch is a switch other than the first switch in the multiple switches, and there is at least one second switch;

obtaining a flow table load of the second switch;

determining a diffusive flow table of the first switch according to the flow table load of the second switch; and sending the diffusive flow table to the first switch.

Optionally, the determining a diffusive flow table of the first switch according to the flow table load of the second switch includes:

determining a forwarding path of the first switch according to a connection relationship between the first switch and the second switch, where the forwarding path is a path between the first switch and the second switch;

determining a diffusion probability of each forwarding path according to a flow table load of the second switch on each forwarding path; and determining the diffusive flow table of the first switch according to the diffusion probability of each forwarding path.

Optionally, the determining the diffusive flow table of the first switch according to the diffusion probability of each forwarding path includes:

determining, according to the diffusion probability of each forwarding path, a quantity of egress ports of the first switch corresponding to each forwarding path, where the egress ports of the first switch are configured to forward data flows; and determining the diffusive flow table of the first switch according to each forwarding path and the quantity of egress ports of the first switch corresponding to each forwarding path.

Optionally, the determining the diffusive flow table of the first switch according to the diffusion probability of each forwarding path includes:

determining, according to the diffusion probability of each forwarding path, a numeric interval corresponding to each forwarding path; and determining the diffusive flow table of the first switch according to each forwarding path and the numeric interval corresponding to each forwarding path.

Specific implementation steps are the same as those in the embodiment shown in FIG. 2. Details are not described herein again.

It can be learnt from the foregoing that, according to the controller provided in this embodiment of the present disclosure, the controller determines a first switch, and determines, according to a network topology, a second switch directly connected to the first switch; the controller obtains a flow table load of the second switch; the controller determines a diffusive flow table of the first switch according to the flow table load of the second switch; and the controller sends the diffusive flow table to the first switch, so that the switch can diffuse, to a neighboring switch according to the diffusive flow table, a data flow that fails to be matched to a flow entry, for processing by the neighboring switch. This lightens load of the first switch.

Figure 13:
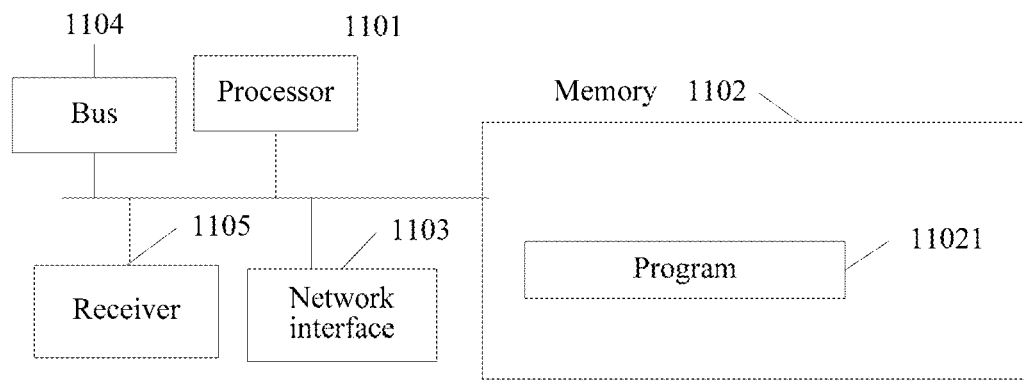
FIG. 13 illustrates a switch according to another embodiment of the present disclosure.

FIG. 13 illustrates a structure of a switch according to another embodiment of the present disclosure. The switch includes at least one processor 1101 (for example, CPU), a memory 1102, at least one network interface 1103, at least one communications bus 1104, and at least one receiver 1105. The communications bus 1104 is configured to implement communication connections between these apparatuses. The processor 1101 is configured to execute an executable module, such as a computer program, stored in the memory 1102. The memory 1102 may include a high-speed random access memory (RAM: Random Access Memory), or may include a non-volatile memory (non-volatile memory), for example, at least an eMMC (Embedded Multi Media Card, embedded multimedia card) memory. A communication connection between the network device and at least one another network element is implemented by using the at least one network interface 1103 (which may be wired or wireless).

In some implementations, the memory 1102 stores a program 11021, and the program 11021 may be executed by the processor 1101. The program includes:

monitoring a flow table load of the switch; and when the flow table load of the switch exceeds a preset threshold, forwarding, by the switch, a target data flow to a neighboring switch according to a diffusion probability, where the target data flow is a data flow that fails to be matched to a flow table of the switch.

Optionally, determining a diffusion probability according to a flow table status includes:

calculating the diffusion probability according to the following formula:

$$Ps = P\mathrm{max} \times \frac{\mathrm{avg} - \mathrm{min}\mathit{thresh}}{\mathrm{max}\mathit{thresh} - \mathrm{min}\mathit{thresh}} + P\mathrm{min},$$

where $P_S$ is the diffusion probability, $P_{max}$ is a preset maximum diffusion probability, Pmin is a preset minimum probability, a flow table usage is used to represent the flow table load, avg is the flow table usage, maxthresh is a first threshold, minthresh is a second threshold, and the first threshold is greater than the second threshold.

Optionally, when the flow table usage of the switch is greater than the first threshold, the switch forwards the target data flow to the neighboring switch according to the preset maximum diffusion probability.

Specific implementation steps are the same as those in the embodiment shown in FIG. 5. Details are not described herein again.

It can be learnt from the foregoing that, according to the switch provided in this embodiment of the present disclosure, the switch monitors a flow table status of the switch; and when a flow table load of the switch exceeds a preset threshold, the switch forwards, to a neighboring switch according to a diffusion probability, a data flow that fails to be matched to a flow table of the switch. When the flow table load of the switch exceeds the preset threshold, the switch may have been attacked. Forwarding a data flow that fails to be matched to a flow table of the switch to the neighboring switch can lighten load of the switch, reduce a frequency at which the switch replaces flow entries, improve a hit ratio of a normal data flow, and reduce a latency.

Figure 14:
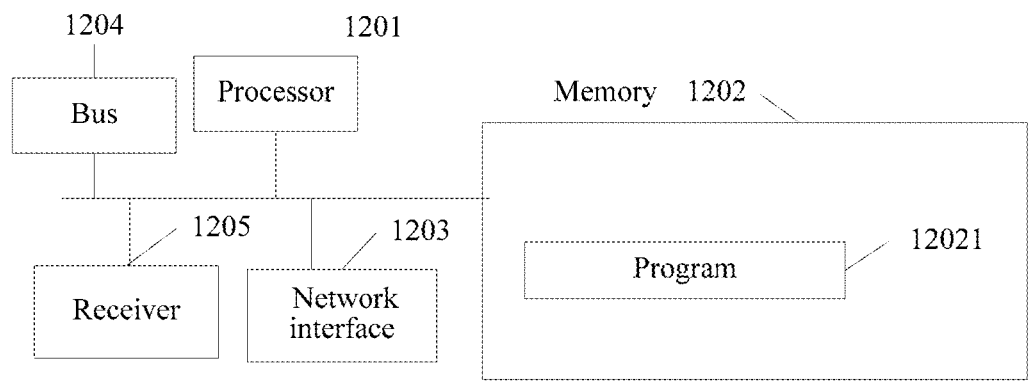
FIG. 14 illustrates a server according to another embodiment of the present disclosure.

FIG. 14 illustrates a structure of a controller according to another embodiment of the present disclosure. The controller includes at least one processor 1201 (for example, a CPU), a memory 1202, at least one network interface 1203, at least one communications bus 1204, and at least one receiver 1205. The communications bus 1204 is configured to implement communication connections between these apparatuses. The processor 1201 is configured to execute an executable module, such as a computer program, stored in the memory 1202. The memory 1202 may include a high-speed random access memory (RAM: Random Access Memory), or may include a non-volatile memory (non-volatile memory), for example, at least an eMMC (Embedded Multi Media Card, embedded multimedia card) memory. A communication connection between the network device and at least one another network element is implemented by using the at least one network interface 1203 (which may be wired or wireless).

In some implementations, the memory 1202 stores a program 12021, and the program 12021 may be executed by the processor 1201. The program includes:

obtaining flow table loads of multiple switches;

determining a connection relationship between the multiple switches according to a network topology;

determining a weight of each forwarding path according to the connection relationship between the multiple switches and the flow table load of each switch of the multiple switches, where the forwarding path is a path between two directly connected switches; and determining a forwarding path for a data flow in an SDN according to the weight of each forwarding path, so that the SDN is in a load-balanced state.

Optionally, the determining a weight of each forwarding path according to the connection relationship between the switches and a flow table usage of each switch of the switches includes:

determining each forwarding path according to the connection relationship between the multiple switches;

determining switches included by each forwarding path; and determining the weight of each forwarding path according to a flow table load of a target switch on each forwarding path, where the target switch is a switch that receives a data flow.

Optionally, the controller calculates the weight of each forwarding path according to the following calculation formula:

$$f(ij) = \begin{cases} 1 & 0 < t \le TH \\ \mathrm{Max} \cdot e^{(t-TH)} & TH < t < 1 \end{cases},$$

where a flow table usage is used to represent the flow table load, TH is a preset flow table usage threshold, Max is a preset constant, f(ij) represents a weight of a forwarding path from a switch i to a switch j, t represents a flow table usage of the switch j, the switch i is among the multiple switches, and the switch j is among the multiple switches.

Specific implementation steps are the same as those in the embodiment shown in FIG. 6. Details are not described herein again.

It can be learnt from the foregoing that, according to the controller provided in this embodiment of the present disclosure, the controller determines a weight of each forwarding path according to a connection relationship between multiple switches and a flow table load of each switch of the multiple switches; and the controller determines a forwarding path for a data flow in an SDN according to the weight of each forwarding path, so that a switch achieves a load-balanced state in a network topology. This improves data flow processing efficiency of the switch.

It should be noted that, to make the description brief, the foregoing method embodiments are described as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are embodiments, and the related actions and modules are not necessarily mandatory to the present disclosure.

Content such as information exchange and an execution process between the modules in the apparatus and the system is based on a same idea as the method embodiments of the present disclosure. Therefore, for specific content, refer to descriptions in the method embodiments of the present disclosure, and details are not described herein again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM: Read-Only Memory), or a random access memory (RAM: Random Access Memory).

Specific examples are used in this specification to describe the principle and implementations of the present disclosure. The descriptions of the foregoing embodiments are merely intended to help understand the method and idea of the present disclosure. In addition, with respect to the specific implementations and the application scope, modifications may be made by a person of ordinary skill in the art according to the idea of the present disclosure. In conclusion, this specification shall not be construed as a limitation on the present disclosure.

What is claimed is:

1. A flow table processing method, wherein the method is applied to a software-defined network (SDN), the SDN comprises a controller and a switch, and the method comprises:
   monitoring, by the switch, a flow table load of the switch;
   when the flow table load of the switch exceeds a preset threshold, determining, by the switch, a diffusion target of a target data flow according to a matching rule of a diffusive flow table, wherein the target data flow is a data flow that fails to be matched to a flow table of the switch, and the diffusive flow table is delivered by the controller; and
   when the determined diffusion target is a neighboring switch of the switch, forwarding, by the switch, the target data flow to the neighboring switch; and,
   wherein the determination of the diffusive flow table of the switch is according to a flow table load of the neighboring switch, and comprises:
   the diffusive flow table of the switch is determined by the controller according to each forwarding path and a quantity of egress ports of the switch corresponding to each forwarding path;
   wherein the quantity of egress ports of the switch corresponding to each forwarding path is determined by the controller according to a diffusion probability of each forwarding path, wherein the egress ports of the switch are configured to forward data flows;
   wherein the diffusion probability of each forwarding path is determined by the controller according to a flow table load of the neighboring switch on each forwarding path;
   the forwarding path of the switch is determined by the controller according to a connection relationship between the switch and the neighboring switch, wherein the forwarding path is a path between the switch and the neighboring switch.

2. The method according to claim 1, wherein the matching rule comprises a correspondence between a port number of the switch and the diffusion target;
   before the determining, by the switch, a diffusion target of a target data flow according to a matching rule of a diffusive flow table, the method further comprises:
   determining, by the switch, a port number of an ingress port, wherein the ingress port is a port from which the switch receives the target data flow; and
   the determining, by the switch, a diffusion target of a target data flow according to a matching rule of a diffusive flow table comprises:
   determining, by the switch, the diffusion target of the target data flow according to the port number of the ingress port and the matching rule.

3. The method according to claim 1, wherein the matching rule comprises a correspondence between a numeric interval and the diffusion target, one numeric interval is corresponding to one diffusion target, and the matching rule comprises at least two numeric intervals;
   before the determining, by the switch, a diffusion target of a target data flow according to a matching rule of a diffusive flow table, the method further comprises:
   performing, by the switch, hash calculation on a packet header field of the target data flow to obtain a numeric value; and
   the determining, by the switch, a diffusion target of a target data flow according to a matching rule of a diffusive flow table comprises:
   determining, by the switch, a numeric interval that the numeric value is in; and
   determining, by the switch, the diffusion target according to the numeric interval and the matching rule.

4. The method according to claim 1, wherein the method further comprises:
   when the determined diffusion target is the controller, requesting, by the switch, the controller for a flow entry that matches the target data flow.

5. A flow table processing method, wherein the method is applied to a software-defined network (SDN), the SDN comprises a controller and multiple switches, and the method comprises:
   determining, by the controller according to a network topology, a second switch directly connected to a first switch, wherein the first switch is any switch of the multiple switches, the second switch is a switch other than the first switch in the multiple switches, and there is at least one second switch;
   obtaining, by the controller, a flow table load of the second switch;
   determining, by the controller, a diffusive flow table of the first switch according to the flow table load of the second switch; and
   sending, by the controller, the diffusive flow table to the first switch;
   the diffusive flow table is used by the first switch to determine, when the flow table load of the first switch exceeds a preset threshold, a diffusion target of a target data flow according to a matching rule of the diffusive flow table, wherein the target data flow is a data flow that fails to be matched to a flow table of the first switch; and,
   wherein determining, by the controller, the diffusive flow table of the first switch according to the flow table load of the second switch comprises:
   determining, by the controller, a forwarding path of the first switch according to a connection relationship between the first switch and the second switch, wherein the forwarding path is a path between the first switch and the second switch;
   determining, by the controller, a diffusion probability of each forwarding path according to a flow table load of the second switch on each forwarding path; and
   determining, by the controller according to the diffusion probability of each forwarding path, a quantity of egress ports of the first switch corresponding to each forwarding path, wherein the egress ports of the first switch are configured to forward data flows;
   determining, by the controller, the diffusive flow table of the first switch according to each forwarding path and the quantity of egress ports of the first switch corresponding to each forwarding path.

6. The method according to claim 5, wherein the determining, by the controller, the diffusive flow table of the first switch according to the diffusion probability of each forwarding path comprises:
   determining, by the controller according to the diffusion probability of each forwarding path, a numeric interval corresponding to each forwarding path; and
   determining, by the controller, the diffusive flow table of the first switch according to each forwarding path and the numeric interval corresponding to each forwarding path.

7. A switch, wherein the switch is applied to a software-defined network (SDN), and the switch comprises a monitoring unit, a first determining unit, and a diffusion unit;

the monitoring unit is configured to monitor a flow table load of the switch;

the first determining unit is configured to: when the flow table load of the switch exceeds a preset threshold, determine, a diffusion target of a target data flow according to a matching rule of a diffusive flow table, wherein the target data flow is a data flow that fails to be matched to a flow table of the switch, and the diffusive flow table is delivered by a controller; and the diffusion unit is configured to: when the determined diffusion target is a neighboring switch of the switch, forward, the target data flow to the neighboring switch; and, wherein the diffusive flow table of the switch is determined according to a flow table load of the neighboring switch, which comprises:

the diffusive flow table of the switch is determined by the controller according to each forwarding path and a quantity of egress ports of the switch corresponding to each forwarding path;

wherein the quantity of egress ports of the switch corresponding to each forwarding path is determined by the controller according to a diffusion probability of each forwarding path, wherein the egress ports of the switch are configured to forward data flows;

wherein the diffusion probability of each forwarding path is determined by the controller according to a flow table load of the neighboring switch on each forwarding path;

the forwarding path of the switch is determined by the controller according to a connection relationship between the switch and the neighboring switch, wherein the forwarding path is a path between the switch and the neighboring switch.

8. The switch according to claim 7, wherein the matching rule comprises a correspondence between a port number of the switch and the diffusion target, and the switch further comprises a second determining unit;

the second determining unit is configured to determine a port number of an ingress port, wherein the ingress port is a port from which the switch receives the target data flow; and the first determining unit is configured to determine the diffusion target of the target data flow according to the port number of the ingress port and the matching rule.

9. The switch according to claim 7, wherein the matching rule comprises a correspondence between a numeric interval and the diffusion target, one numeric interval is corresponding to one diffusion target, the matching rule comprises at least two numeric intervals, and the switch further comprises a hash unit;

the hash unit is configured to perform hash calculation on a packet header field of the target data flow to obtain a numeric value; and the first determining unit is configured to determine a numeric interval that the numeric value is in, and determine the diffusion target according to the numeric interval and the matching rule.

10. The switch according to claim 7, wherein the first determining unit is further configured to: when the determined diffusion target is the controller, request the controller for a flow entry that matches the target data flow.

11. A controller, wherein the controller is applied to a software-defined network (SDN), the SDN comprises the controller and multiple switches, and the controller comprises a determining unit, an obtaining unit, and a sending unit;

the determining unit is configured to determine, according to a network topology, a second switch directly connected to a first switch, wherein the first switch is any switch of the multiple switches, the second switch is a switch other than the first switch in the multiple switches, and there is at least one second switch;

the obtaining unit is configured to obtain a flow table load of the second switch;

the determining unit is further configured to determine a diffusive flow table of the first switch according to the load of the second switch; and the sending unit is configured to send the diffusive flow table to the first switch;

the diffusive flow table is used by the first switch to determine, when the flow table load of the first switch exceeds a preset threshold, a diffusion target of a target data flow according to a matching rule of the diffusive flow table, wherein the target data flow is a data flow that fails to be matched to a flow table of the first switch; and, wherein the determining unit comprises a first determining subunit, a second determining subunit, and a third determining subunit, wherein the first determining subunit is configured to determine a forwarding path of the first switch according to a connection relationship between the first switch and the second switch, wherein the forwarding path is a path between the first switch and the second switch;

the second determining subunit is configured to determine a diffusion probability of each forwarding path according to a flow table load of the second switch on each forwarding path; and the third determining subunit is configured to determine, according to the diffusion probability of each forwarding path, a quantity of egress ports of the first switch corresponding to each forwarding path, wherein the egress ports of the first switch are configured to forward data flows; and the third determining subunit is further configured to determine the diffusive flow table of the first switch according to each forwarding path and the quantity of egress ports of the first switch corresponding to each forwarding path.

12. The controller according to claim 11, wherein the third determining subunit is configured to determine, according to the diffusion probability of each forwarding path, a numeric interval corresponding to each forwarding path; and the third determining subunit is further configured to determine the diffusive flow table of the first switch according to each forwarding path and the numeric interval corresponding to each forwarding path.

* * * * *